United States Patent
Mahabob

(10) Patent No.: US 11,931,216 B1
(45) Date of Patent: Mar. 19, 2024

(54) ROOT CANAL IRRIGANT NEEDLE

(71) Applicant: KING FAISAL UNIVERSITY, Al-Ahsa (SA)

(72) Inventor: Nazargi Mahabob, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/141,536

(22) Filed: May 1, 2023

(51) Int. Cl.
*A61C 17/02* (2006.01)

(52) U.S. Cl.
CPC ................... *A61C 17/02* (2013.01)

(58) Field of Classification Search
CPC .. A61C 17/02; A61C 5/40; A61C 5/42; A61C 5/44; A61C 5/62; A61C 5/50
See application file for complete search history.

(56) References Cited

U.S. PATENT DOCUMENTS

| | | | |
|---|---|---|---|
| 6,162,202 A * | 12/2000 | Sicurelli | A61C 5/40 604/525 |
| 2002/0090591 A1 | 7/2002 | Fischer | |
| 2005/0197683 A1* | 9/2005 | Levatino | A61C 1/087 607/89 |
| 2007/0193326 A1 | 8/2007 | Bogart et al. | |
| 2015/0050613 A1 | 2/2015 | Berkely et al. | |
| 2021/0154412 A1 | 5/2021 | Dietschi et al. | |
| 2021/0212799 A1* | 7/2021 | Ruddle | A61C 5/40 |
| 2021/0290918 A1 | 9/2021 | Skak et al. | |

* cited by examiner

*Primary Examiner* — Jan Christopher L Merene
*Assistant Examiner* — Luis M Ruiz Martin
(74) *Attorney, Agent, or Firm* — Nath, Goldberg & Meyer; Richard C. Litman

(57) ABSTRACT

A root canal irrigant needle for use with a dental syringe for use in a dental procedure such as a root canal is provided. The root canal irrigant needle has a non-circular shape and has multiple irrigant outlets located along the length of the root canal irrigant needle. The location and angular orientation of the multiple irrigant outlets allow for an efficient removal of debris from the root canal.

6 Claims, 1 Drawing Sheet

ROOT CANAL IRRIGANT NEEDLE

BACKGROUND

1. Field

The present subject matter relates to dental systems, methods, and devices for dental syringes.

2. Description of the Related Art

The dental syringe is a multi-purpose dental apparatus which is often used by dentists, dental assistants, dental hygienists, and other personnel for a wide range of dental visits. The dental syringe often includes a water port and a pressurized air port and can be used for providing irrigation to a target site, clearing or removing debris from a target site, drying a target site for bonding with another dental apparatus, and a variety of other uses.

Generally, such dental syringes include a syringe tip which directs the flow of water and air from the dental syringe tip with the target site. Due to the proximity of the syringe tip with the target location, it is inevitable that some of the contaminants from the patient such as bacteria, viruses, and bodily fluids, will contact and contaminate the syringe tip. Accordingly, there is a need to develop devices, systems, and methods which significantly reduce or eliminate such a risk of spreading these contaminants.

Successful root canal therapy relies on the combination of proper instrumentation, irrigation, and obturation of the root canal. Of these three essential steps of root canal surgery, irrigation of the root canal is the most important determinant in the healing of the periapical tissues. The endodontic treatment goal must thus be to optimize root canal disinfection and to prevent reinfection. These root canal irrigants play a key role in the success of root canal treatment by removing infected and non-infected particles from the root canal after instrumentation and further acting as a lubricant during the use of instrumentation in the root canal.

There are several types of root canal irrigants available to the practitioner which can be used according to a particular need. These irrigants are injected into the root canal treatment area through a dental syringe and needle system. Whenever using these needles, if the irrigant has been forcefully injected in the root canal, it will reach beyond the periapical region and induce severe pain and necrosis of the tissues. This happens due to the shape of the needles as those needles commonly used are circular in shape and have an injecting point present only in the tip of the needles as a single outlet, which can result in accidental release of the irrigant where it is not desired.

What is needed is a way to avoid the mishaps that can occur with forceful injections during a root canal procedure.

SUMMARY

The present subject matter is directed to a root canal irrigant needle that eliminates mishaps caused by forceful injections from existing circular needles. This is accomplished by providing a needle having a four-point start shape, rather than a circular shape, having irrigant outlets along the shaft of the needle, rather than at the tip of the needle. Accordingly, the tip of the needle described herein is a closed end. As such, with this configuration, a dental syringe now employing the present needle will not allow the discharged irrigant to reach the apical region of the root either directly or forcefully.

In an embodiment, the present subject matter is directed to a root canal irrigant needle for use with a dental syringe, the needle comprising: a four-point star shaped shaft; a plurality of irrigant outlets on only one side of the four-point star shaped shaft for ejecting irrigant during a dental procedure; and a closed distal end of the four-point star shaped shaft.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
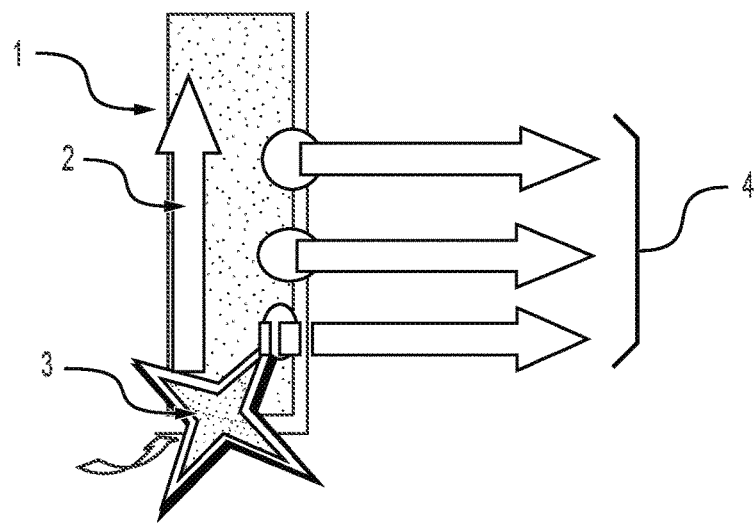
FIG. 1 is side view of a first embodiment of the root canal irrigant needle for use with a dental syringe used for root canal surgery.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

In an embodiment, the present subject matter is directed to a root canal irrigant needle for use with a dental syringe, the needle comprising: a four-point star shaped shaft; a plurality of irrigant outlets on only one side of the four-point star shaped shaft for ejecting irrigant during a dental procedure; and a closed distal end of the four-point star shaped shaft.

In one embodiment, each of the plurality of irrigant outlets are vertically situated on a vertex between a first arm and a second arm of said four-point star shaped shaft. Further, said plurality of irrigant outlets can be oriented at an angle in the range of about 60 degrees to about 70 degrees downwards from a root canal wall of said dental procedure. In one embodiment, the plurality of irrigant outlets comprises three irrigant outlets. In another embodiment, the plurality of irrigant outlets permit irrigant to reach an apical region of a tooth root either directly or forcefully during said dental procedure. Accordingly, the present four-point star shaped shaft is designed to prevent irrigant toxicity in the periapical region of the tooth root.

In a further embodiment, said four-point star shaped shaft forms multiple channels for debris to escape said dental procedure.

Figure 2:
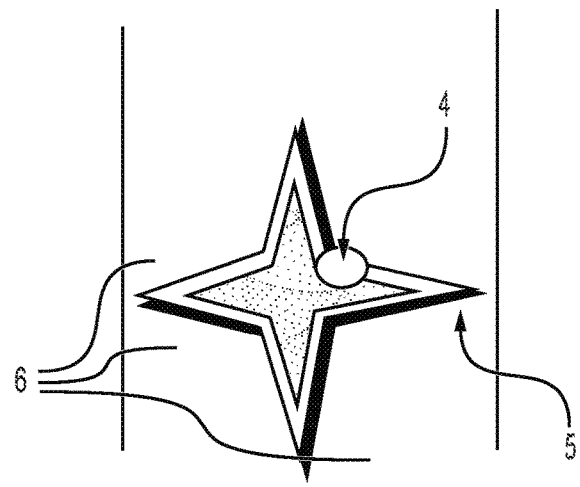
FIG. 2 is a diagram of the tip of the root canal irrigant needle for use with a dental syringe within the root canal.

As shown in FIG. 1, an embodiment of the root canal irrigant needle for use with a dental syringe is shown in a cross-section form where the shape of the shaft of the needle is generally a four-point star shape (1) with a closed end (3). That is to say, a cross-section of the shaft of the needle will have a four-point star shape. By providing a needle with this four-point star shape (1), enough space is provided for the discharged irrigant and/or debris to escape from the root canal so no additional instrumentation or even air need be used in order to clear the root canal of irrigant and/or debris. Additionally, the four-point star shaped needle has multiple irrigant outlets (4), as shown in FIG. 1, along the vertical length (4) of the shaft of the needle at a vertex between two arms of the four-point star shape, as shown in FIG. 2.

Accordingly, there are no irrigant outlets at the tip of the needle/shaft, meaning the needle/shaft has a closed end or tip (3).

The design of the four-point star shape needle (1) is such that only two points of the star make contact (5) with an inner surface of the root canal wall and that such a configuration (6) allows for a plurality of channels of passage for debris and/or irrigant to escape (2) from the root canal as a result of the irrigant being ejected out of the plurality of outlets (4). In this regard, the four-point star shape needle (1), in some embodiments, can have three channels, represented by three outlets (4), of passage for debris and/or irrigant to escape (2) from the root canal.

The multiple outlets (4) for the irrigant also can be oriented at an angle in the range of about 60 degrees to about 70 degrees downwards when facing the root canal walls such that irrigant ejection at this angular orientation can efficiently flush out any debris within the root canal. While a circular or oval type opening is generally depicted, non-circular apertures can be used to alter the discharge pattern and/or discharge pressure as it exits the side of the four-point star shaped needle (1). In this regard, both the four-point star shaped needle (1) and the multiple outlets (4) therein can have no taper, have a narrowing taper, have an expanding taper, or a combination of the above.

Figure 3:
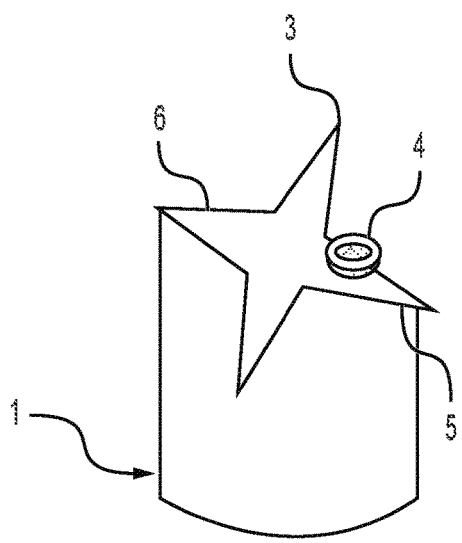
FIG. 3 is a diagram of a distal end of the root canal irrigant needle for use with a dental syringe showing the closed end tip and one irrigant outlet.

FIG. 3 shows the distal end of the tip (3) of the four-point star shaped needle (1) used with the dental syringe. The distal end shows the closed end profile of the star-shaped needled used with the dental syringe. Additionally, FIG. 3 shows the most distally situated irrigant outlet from the multiple outlets of FIG. 1.

In certain embodiments, the four-point star shaped needle (1) can be made of a metal, such as, by way of non-limiting example, stainless steel, NiTi, or the like. In other embodiments, the four-point star shaped needle (1) can be made of a more flexible material, such as, by way of non-limiting example, a plastic, polymer, or elastomer, such as polypropylene, polyimide, or the like.

In some embodiments, the four-point star shaped needle can be manufactured from materials having anti-microbial properties to reduce or inhibit the accumulation of bacteria, viruses, fungi, and/or parasites. This can advantageously enhance the shelf-life of such components. An anti-microbial material can also optionally be placed on the needle via a coating.

The four-point star shaped needle can be manufactured using multiple manufacturing techniques. By way of non-limiting example, in some embodiments, the four-point star shaped needle can be manufactured using manufacturing techniques such as injection molding, extrusion or pultrusion, overmolding, machining, a combination of these techniques or similar manufacturing techniques.

It is to be understood that the root canal irrigant needle is not limited to the specific embodiment described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A root canal irrigant needle for use with a dental syringe, the needle comprising:
   a four-point star shaped shaft, wherein the four-point star of the four-point star shaped shaft defines four arms, wherein each of the arms has a pair of linear sides, and wherein adjacent ones of the four arms each define a vertex therebetween;
   a plurality of irrigant outlets on only one side of the four-point star shaped shaft for ejecting irrigant during a dental procedure; and
   a closed distal end of the four-point star shaped shaft,
   wherein at least one pair of the adjacent ones of the four arms of the four-point star shaped shaft define a channel for removal of debris and/or the irrigant.

2. The root canal irrigant needle for use with a dental syringe as recited in claim 1, wherein each of said plurality of irrigant outlets are vertically situated on a vertex between a first arm and a second arm of said four-point star shaped shaft.

3. The root canal irrigant needle for use with a dental syringe as recited in claim 2, wherein said plurality of irrigant outlets are oriented at an angle in the range of about 60 degrees to about 70 degrees downwards from a root canal wall of said dental procedure.

4. The root canal irrigant needle for use with a dental syringe as recited in claim 2, wherein the plurality of irrigant outlets comprises three irrigant outlets.

5. The root canal irrigant needle for use with a dental syringe as recited in claim 2, wherein the plurality of irrigant outlets permit irrigant to reach an apical region of a tooth root either directly or forcefully during said dental procedure.

6. The root canal irrigant needle for use with a dental syringe as recited in claim 1, wherein the at least one pair of the adjacent ones of the four arms of the four-point star shaped shaft comprises a plurality of pairs of the adjacent ones of the four arms of the four-point star shaped shaft each defining a corresponding channel for removal of the debris and/or the irrigant.

\* \* \* \* \*